United States Patent [19]

Symon

[11] 4,073,136

[45] Feb. 14, 1978

[54] FUEL SYSTEM FOR GAS TURBINE ENGINES

[75] Inventor: Roger James Symon, Bristol, England

[73] Assignee: Rolls-Royce (1971) Limited, Great Britain

[21] Appl. No.: 718,418

[22] Filed: Aug. 27, 1976

[30] Foreign Application Priority Data

Sept. 12, 1975 United Kingdom ............... 37535/75

[51] Int. Cl.² .............................................. F02C 9/10
[52] U.S. Cl. ........................... 60/39.28 R; 60/39.09 D
[58] Field of Search ..................... 60/39.28 R, 39.09 D

[56] References Cited

U.S. PATENT DOCUMENTS

| 2,670,082 | 2/1954 | Dunn | 60/39.09 D |
|---|---|---|---|
| 3,627,239 | 12/1971 | Hull | 60/39.28 R |
| 3,645,094 | 2/1972 | Suggs | 60/39.28 R |
| 3,736,072 | 5/1973 | Turner | 60/39.28 R |
| 3,779,007 | 12/1973 | Lavash | 60/39.28 R |
| 3,874,168 | 4/1975 | Toure | 60/39.28 R |

Primary Examiner—Clarence R. Gordon
Attorney, Agent, or Firm—Stevens, Davis, Miller & Mosher

[57] ABSTRACT

A fuel system for a gas turbine engine has in flow series a low pressure pump, a filter and a high pressure pump, latter being connected to a delivery duct leading to the engine. The low pressure pump is a jet pump wherein the jet is produced by spill flow from the delivery duct. The spill flow is heated to prevent ice formation in the filter.

1 Claim, 1 Drawing Figure

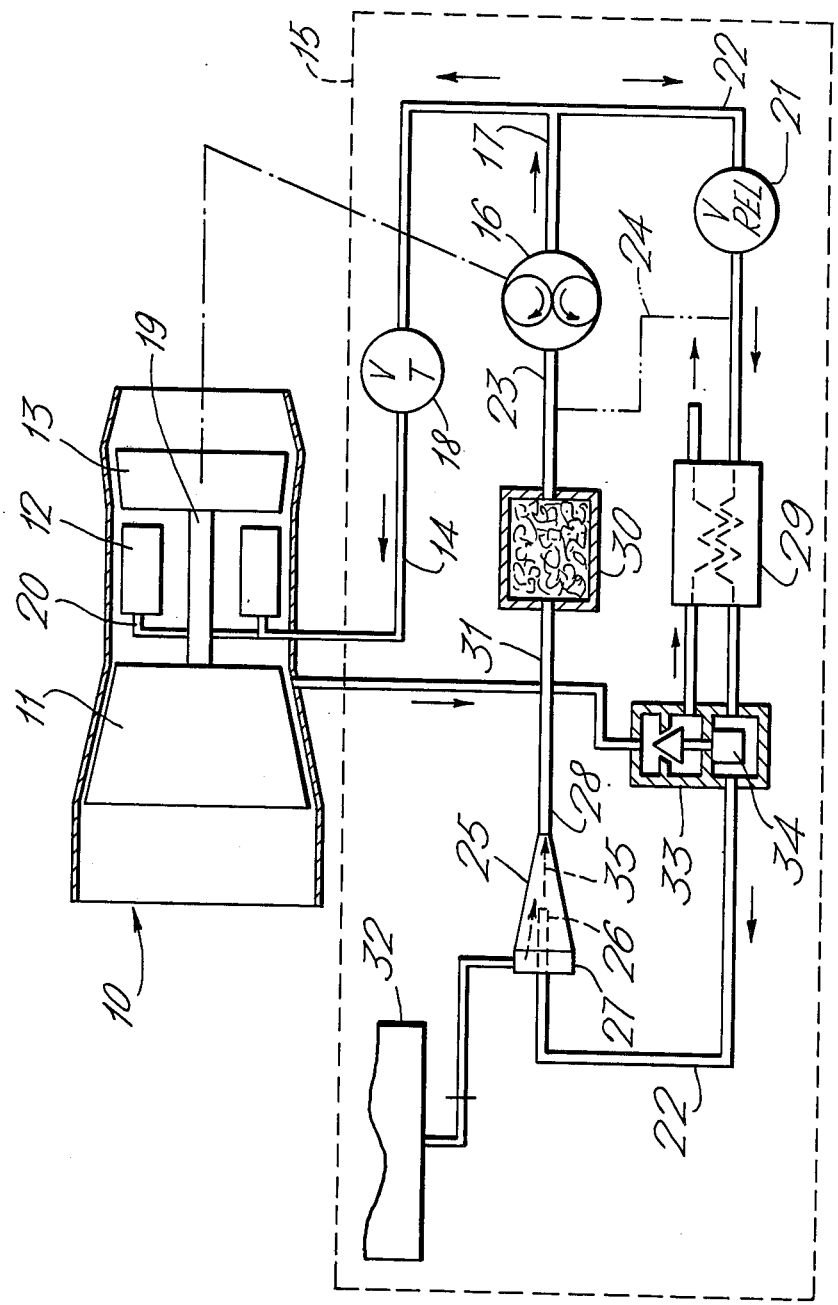

FUEL SYSTEM FOR GAS TURBINE ENGINES

This invention relates to a fuel system for gas turbine engines.

It is known for such a system to comprise a fuel feed line connectable to a fuel source, a fuel delivery line connectable to the engine, a high pressure pump having an inlet from said feed line and an outlet to said delivery line, a low pressure pump, a heater and a filter connected sequentially in said feed line, and a spill line connected between the delivery line and the feed line downstream of the filter.

The heater is necessary to avoid ice formation in the filter but the presence of the heater involves a substantial pressure drop in the feed line and a correspondingly high pressure capacity in the low pressure pump.

According to this invention there is provided a fuel system for a gas turbine engine as stated in the claims hereto.

By connecting the spill line to the feed line in position upstream of the filter and by arranging the heater at a spill fuel-carrying line of the system the temperature rise in the fuel due to the high pressure pump is used to pre-heat the fuel entering the heater so that the capacity thereof is reduced with a consequent reduction in the pressure capacity of the low pressure pump.

An example of a fuel system according to this invention will now be described with reference to the accompanying drawing which is a diagrammatic representation of the system and of an associated gas turbine engine.

The engine, denoted 10, has, in flow series, an air compressor 11, a combustion chamber 12 and a turbine 13, latter being connected by a shaft 19 to drive the compressor. The combustion chamber has burners 20 connected through a fuel delivery duct 14 to the fuel supply system generally denoted 15.

In the system 15 a positive displacement pump 16 has an outlet 17 to a throttle valve 18 feeding the duct 14. The pump is driven by the shaft 19 at a speed proportional to engine speed but the throttle valve 18 is adjustable such as to vary the fuel flow independently of pump output. To accommodate such variation the pump is proportioned to supply at all times a pressure at least as high as the maximum likely to be required and the consequent excess of fuel pressure is relieved through a pressure relief valve 21 in a spill duct 22 connected to return the excess or "spill" flow to the inlet, denoted 23, of the pump 16. As described so far the arrangement is known. The invention is concerned with the way in which the spill flow return is arranged, and in the invention account is taken of three further components of known systems, namely of a low pressure pump needed to feed the pump 16 (latter is also referred to as "the high pressure pump"), a fuel filter needed in the connection between the pumps, and a heater needed to heat the fuel to avoid icing of the filter.

In known systems the spill flow is returned directly to the inlet 23 of the pump 16, as indicated by a line 24, and the heater and filter were provided sequentially in a fuel feed line 31 leading to the pump inlet 23. This had the disadvantage that the low pressure pump had to generate a considerable pressure rise, and at least a centrifugal pump was necessary for this purpose. Such a pump does of course necessitate a shaft drive of relatively high speed and generally adds to the items of the powerplant which require service and maintainance.

The invention provides that the spill duct 22 is connected to the feed duct 31 in a position upstream of the filter 30 and that the heater denoted 29, is positioned at the duct 22 or any part of the duct 31 upstream of the filter and carrying spill fuel. This has the advantages that the pressure rise through the low pressure pump is reduced so that a pump of much lesser power than heretofore can be used, and that the temperature rise of the fuel due to the pump 16 is utilized to pre-heat the fuel so that a heat exchanger of lower capacity and correspondingly lesser weight than heretofore can be used. It is true that in this arrangement the high pressure pump has to have a higher capacity than heretofore to overcome the pressure drop through the heat exchanger but the reduction in the capacities of the heat exchanger and the low pressure pump are such that there is a significant net advantage.

In the present example the heater 29 is arranged at the spill line 22 and the low pressure pump is in the form of a jet pump, being a pump, known per se, not requiring a mechanical drive and generally not requiring service and maintainance. As shown, the pump 25 has a central nozzle 26 connected to the duct 22 whose delivery produces a jet 35 causing flow of fuel to be energised or entrained through an annular inlet chamber 27 connected to a supply tank 32.

The heater 29 is in the form of a heat exchanger whose heated fluid duct is connected in series in the duct 22 and whose heating fluid duct is supplied with hot air from the compressor of the engine. The flow of air is controlled by a valve 33 in turn controlled by a thermostat 34 in the duct 22.

I claim:

1. A fuel system for a gas turbine engine, comprising a fuel source, a low pressure jet pump having an inlet chamber connected to said fuel source, said pump including a nozzle for energizing the fluid in the chamber and an outlet for the energized fluid, a filter, a high pressure pump, conduit means connecting in series said outlet of said jet pump said filter said high pressure pump and the engine, and a branch conduit extending from said high pressure pump to said nozzle of the jet pump to supply energizing fluid thereto, said branch including a heater for the fluid passing through said branch thereby to heat the fluid supplied by said jet pump to said filter.

* * * * *